United States Patent Office 3,230,257
Patented Jan. 18, 1966

3,230,257
ALKYLATED AROMATIC AMINES
Louis Schmerling, Riverside, Ill., assignor to Universal Oil Products Company, Des Plaines, Ill., a corporation of Delaware
No Drawing  Filed Feb. 13, 1963, Ser. No. 258,164
15 Claims.  (Cl. 260—576)

This application relates to a process for the production of alkyl aromatic amines. More specifically, the invention is concerned with a process for the preparation of nuclearly and N-alkylated aromatic amines.

It has now been discovered that aromatic amines may be alkylated in nuclear and N positions by condensing an aromatic amine hydrohalide with an alkylating agent comprising an olefinic hydrocarbon. The products thus prepared according to the process of this invention will find a wide variety of use in the chemical field particularly as intermediates in the preparation of dyes, pharmaceuticals, light-sensitive diazonium salts which are used for diazo printing papers and inhibitors which will retard the oxidative deterioration of various organic materials such as motor fuel (particularly unsaturated gasolines as, for example, cracked gasoline and polymer gasolines), diesel oil, mineral oil, lubricating oil, fuel oil, drying oil, greases, rubber monomers such as styrene, butadiene, etc., paraffin waxes, edible fats and oils, etc.

Among the edible fats and oils which may be of animal, vegetable or mineral origin and which tend to become rancid especially during long periods of storage prior to use are linseed oil, menhadin oil, cod liver oil, castor oil, olive oil, rapeseed oil, coconut oil, palm oil, corn oil, sesame oil, peanut oil, babassu oil, butter, fat, lard, beef tallow, etc. are well as the hydrogenated oils. These materials are adversely affected by oxygen with the resultant formation of undesirable gums, discoloration, rancidity or other deleterious reactions. Therefore, certain substances must be added to the aforementioned organic materials which act to stabilize such materials and thus delay or prevent the undesired reactions from occurring. These additives will fall within the broad term "inhibitors" which may be prepared from the intermediates formed according to the process of this invention.

It is therefore an object of this invention to provide a process for the preparation of alkylated aromatic amines.

Another object of this invention is to provide a process for preparing nuclearly and N-alkylated aromatic amines which are useful, as hereinbefore set forth, as intermediates in the preparation of other organic compounds.

Taken in its broadest aspect one embodiment of this invention resides in a process for the production of an alkyl substituted aromatic amine which comprises alkylating a hydrohalide salt of an aromatic amine with an alkylating agent at alkylating conditions, and recovering the desired alkyl substituted aromatic amine.

Another embodiment of this invention is found in a process for the production of an alkyl substituted aromatic amine which comprises alkylating aniline hydrochloride with an olefin at a temperature in the range of from about 200° to about 400° C. and at a pressure within the range of from about atmospheric to about 100 atmospheres, and recovering the desired alkyl substituted aniline.

A further embodiment of this invention is found in a process for the production of an alkyl substituted aromatic amine which comprises alkylating 1-naphthylamine hydrochloride with an olefin at a temperature in the range of from about 200° to about 400° C. and at a pressure within the range of from about atmospheric to about 100 atmospheres, and recovering the desired alkyl substituted 1-naphthylamine.

A specific embodiment of this invention is found in a process for the production of an alkyl substituted aromatic amine which comprises alkylating aniline hydrochloride with ethylene at a temperature in the range of from about 200° to about 300° C. and at a pressure in the range of from about 30 to about 50 atmospheres, and recovering the desired ethylated aniline.

Other objects and embodiments referring to alternative olefinic hydrocarbons and alternative hydrohalide salts of aromatic amines will be found in the following further detailed description of this invention.

As hereinbefore set forth, it has now been discovered that alkylated aromatic amines may be prepared by condensing an alkylatable aromatic amine and particularly a hydrahalide salt of an aromatic amine with an olefinic hydrocarbon to prepare nuclearly and N-alkylated aromatic amines. Particularly useful hydrohalide salts of aromatic amines which may be utilized in the process of this invention include aniline hydrochloride, aniline hydrobromide, o-toluidine hydrochloride, o-toluidine hydrobromide, m-toluidine hydrochloride, m-toluidine hydrobromide, p-toluidine hydrochloride, p-toluidine hydrobromide, 2,4-dimethylaniline hydrochloride, 2,4-dimethylaniline hydrobromide, 2,5-dimethylaniline hydrochloride, 2,5-dimethylaniline hydrobromide, 2,6-dimethylaniline hydrochloride, 2,6-dimethylaniline hydrobromide, 2,4,6-trimethylaniline hydrochloride, 2,4,6-trimethylaniline hydrobromide, o-ethylaniline hydrochloride, o-ethylaniline hydrobromide, m-ethylaniline hydrochloride, m-ethylaniline hydrobromide, p-ethylaniline hydrochloride, p-ethylaniline hydrobromide, 2,4-diethylaniline hydrochloride, 2,4-diethylaniline hydrobromide, 2,5-diethylaniline hydrochloride, 2,5-diethylaniline hydrobromide, 2,6-diethylaniline hydrochloride, 2,6-diethylaniline hydrobromide, 2,4,6-triethylaniline hydrochloride, 2,4,6-triethylaniline hydrobromide, 1-naphthylamine hydrochloride, 1-naphthylamine hydrobromide, 2-naphthylamine hydrochloride, 2-naphthylamine hydrobromide, 1-methyl-2-naphthylamine hydrochloride, 1-methyl-2-naphthylamine hydrobromide, 3-methyl-2-naphthylamine hydrochloride, 3-methyl-2-naphthylamine hydrobromide, 2-methyl-1-naphthylamine hydrochloride, 2-methyl-1-naphthylamine hydrobromide, 3-methyl-1-naphthylamine hydrochloride, 3-methyl-1-naphthylamine hydrobromide, 1-ethyl-2-naphthylamine hydrochloride, 1-ethyl-2-naphthylamine hydrobromide, 2-ethyl-1-naphthylamine hydrochloride, 2-ethyl-1-naphthylamine hydrobromide, o-phenylenediamine hydrochloride, o-phenylenediamine hydrobromide, m-phenylenediamine hydrochloride, m-phenylenediamine hydrobromide, p-phenylenediamine hydrochloride, p-phenylenediamine hydrobromide, 4-methyl-o-pheneylenediamine hydrochloride, 4-methyl-o-phenylenediamine hydrobromide, 4-methyl-m-phenylenediamine hydrochloride, 4-methyl-m-phenylenediamine hydrobromide, 4-ethyl-o-phenylenediamine hydrochloride, 4-ethyl-o-phenylenediamine hydrobromide, 4-ethyl-m-phenylenediamine hydrochloride, 4-ethyl-m-phenylenediamine hydrobromide, 2-methyl-m-phenylenediamine hydrochloride, 2-methyl-m-phenylenediamine hydrobromide, 2-methyl-p-phenylenediamine hydrochloride, 2-methyl-p-phenylenediamine hydrobromide, 2-ethyl-m-phenylenediamine hydrochloride, 2-ethyl-m-phenylenediamine hydrobromide, 2-ethyl-p-phenylenediamine hydrochloride, 2-ethyl-p-phenylenediamine hydrobromide, 1,2,3-triaminobenzene hydrochloride, 1,2,3-triaminobenzene hydrobromide, 1,2,4-triaminobenzene hydrochloride, 1,2,4-triaminobenzene hydrobromide, 1,3,5-triaminobenzene hydrochloride, 1,3,5-triaminobenzene hydrobromide, etc.

Suitable alkylating agents which may be utilized in the process of this invention include olefins, the term "olefin" including both mono- and diolefinic compounds. Examples of such olefins include straight-chain monoolefins containing only carbon and hydrogen atoms such as ethylene, propylene, 1-butene, 2-butene, 1-pentene, 2-pentene, 1-hexene, 2-hexene, 3-hexene, 1-heptene, 2-heptene, 3-heptene, 4-heptene, the isomeric octenes, nonenes, decenes, undecenes, dodecenes, etc.; branched-chain monoolefins such as methylpropene, 3-methyl-1-butene, 2-methyl-2-butene, 2-methyl-1-pentene, 3-methyl-1-pentene, 4-methyl-1-pentene, 2-methyl-2-pentene, 3-methyl-2-pentene, 2,3-dimethyl-2-pentene, 2,3-dimethyl-1-pentene, 2-methyl-1-hexene, 3-methyl-1-hexene, 4-methyl-1-hexene, 3,3-dimethyl-1-hexene, 2-methyl-2-hexene, 3-methyl-2-hexene, 4-methyl-2-hexene, 2,3-dimethyl-2-hexene, 2,4-dimethyl-2-hexene, etc.; straight-chain and branched-chain alkadienes such as 1,3-butadiene, 1,3-pentadiene, isoprene, 2,4-pentadiene, 1,3-hexadiene, 2,4-hexadiene, the isomeric heptadienes, octadienes, nonadienes, decadienes, undecadienes, dodecadienes, etc. Aromatic olefins such as styrene may also be used, but not necessarily with equivalent results. It is to be understood that the aforementioned hydrohalide salts of aromatic amines and olefinic hydrocarbons are only representatives of the class of compounds which may be used and that the process of the present invention is not necessarily limited thereto.

The alkylation of the hydrohalide salt of the aromatic amine is usually effected at elevated temperatures and pressures. The alkylation conditions which are used include a temperature within the range of from about 200° to about 400° C. or more, preferably in a range of from about 200° to about 300° C. In addition, the reaction is effected at temperatures ranging from about atmospheric to about 150 atmospheres or more, the preferred pressure being that which is sufficient to maintain at least a portion of the reactants in the liquid phase. If so desired, such pressure may be found by the introduction of a substantially inert gas such as nitrogen into the reaction zone.

The process of this invention may be effected in any suitable manner and may comprise either a batch or continuous type operation. For example, when a batch type operation is used, a quantity of the hydrohalide salt of the aromatic amine and the alkylating agent are placed in an appropriate apparatus provided with heating means. A particularly applicable apparatus in which to effect the batch type operation of the present process comprises a rotating autoclave. When such an apparatus is used, the aforementioned materials are placed in the autoclave, following which it is sealed and heated to the desired temperature. As also hereinbefore set forth, if superatmospheric pressures are desired, an inert gas such as nitrogen is pressed in to effect said pressure. However, when utilizing normally gaseous olefins such as ethylene, propylene or butene, the pressure may be effected by pressing in a sufficient amount of the gaseous olefin. Upon completion of the desired residence time, the autoclave and contents thereof are cooled to room temperature. The excess pressure is vented and the autoclave is opened. The reaction product is then recovered and treatment by conventional means is used. An example of such treatment is to wash the product with water and extract with an organic solvent such as ether to remove any acid-insoluble material which may be present. Following this the aqueous solution is made alkaline, the liberated aromatic amines are extracted with ether, pentane or other solvent and the extract is subjected to fractional distillation under reduced pressure and the desired alkylated aromatic amine is separated and recovered.

It is also contemplated within the scope of this invention that the process described herein may be effected in a continuous manner of operation although not necessarily with equivalent results. When such a method is used, the starting products comprise the hydrohalide salt of the aromatic amine and the alkylating agent are continuously charged to a reaction zone which is maintained at the proper operating conditions of temperature and pressure. Upon completion of the desired residence time, the reactor effluent is continuously withdrawn, separated from unreacted olefin which may be recycled to form a portion of the feed stock, and the reaction product is subjected to treatment in a manner similar to that hereinbefore set forth whereby the desired product is separated and recovered.

Examples of nuclearly and N-alkylated aromatic amines which may be prepared according to the process of this invention include N-ethylaniline, N,N-diethylaniline, o-ethylaniline, m-ethylaniline, p-ethylaniline, 2,4-diethylaniline, N,2,4 - triethylaniline, N - isopropylaniline, N,N-diisopropylaniline, o-isopropylaniline, m-isopropylaniline, p-isopropylaniline, 2,4-diisopropylaniline, N,2,4-triisopropylaniline, N-butylanilines, N,N-dibutylanilines, o-butylanilines, m-butylanilines, p-butylanilines, 2,4-dibutylanilines, N,2,4 - tributylanilines, N - pentylanilines, N,N-dipentylanilines, o-pentylanilines, m-pentylanilines, p-pentylanilines, 2,4-dipentylanilines, N,2,4-tripentylanilines, N-hexylanilines, N,N-dihexylanilines, o-hexylanilines, m-hexylanilines, p-hexylanilines, 2,4-dihexylanilines, N,2,4-trihexylanilines, etc.

The following examples are given to illustrate the process of the present invention which, however, are not intended to limit the generally broad scope of the present invention in strict accordance therewith.

*Example I*

In this example 38 grams of aniline hydrochloride was placed in the glass liner of a rotating autoclave. The liner was sealed into the autoclave and ethylene pressed in until an initial pressure of 50 atmospheres had been reached. The autoclave was then heated to a temperature ranging from 200° to 300° C. and maintained thereat for a period of about 5 hours. During this time the pressure rose to a maximum of 138 atmospheres. At the end of the reaction time the autoclave and contents thereof were allowed to cool to room temperature, the final pressure at room temperature being 35 atmospheres. The excess pressure was vented and the reaction product comprising 62 grams of an amber viscous liquid along with a small amount of a white solid was recovered. The material was treated with water and extracted with ether. The aqueous solution of the product was made basic with alkali and again extracted with ether. Following this the ether extract was subjected to fractional distillation under reduced pressure. The cut boiling chiefly at 74°–76° C. at 0.5 mm. pressure (260°–262° C. at 760 mm. pressure) having a refractive index $n_D^{21}$ of 1.5236 was recovered. A determination of the basic nitrogen content of this cut indicated a molecular weight of 184.0, the molecular weight calculated for triethylaniline being 177.3. Nuclear magnetic resonance and infrared analyses indicated that this cut was largely N,2,4-triethylaniline.

*Example II*

A glass liner of a rotating autoclave containing 38 grams of aniline hydrochloride is sealed into the autoclave and propylene charged thereto until an initial pressure of 50 atmospheres is reached. The autoclave is heated to a temperature in the range of from about 200° to about 300° C. and maintained thereat for a period of about 5 hours. Following this time the autoclave and contents thereof are allowed to cool to room temperature, the excess pressure is vented and the reaction product recovered. The product is washed with water and extracted with ether. Following separation of the aqueous solution and the ether extract, the aqueous solution is made basic with an alkali and again extracted with ether. The ether extract is subjected to fractional distillation under reduced pressure and the desired propylated aniline is separated and recovered.

*Example III*

A glass liner of a rotating autoclave containing 43 grams of p-toluidine hydrochloride is sealed in the autoclave and ethylene pressed in until an initial pressure of 50 atmospheres is reached. Following this, the autoclave is heated to a temperature of about 200° C. and maintained within a range of from about 200° to about 300° C. for a period of about 5 hours. Following this the autoclave and contents thereof are allowed to cool to room temperature, the excess pressure is vented and the reaction product is separated and recovered. The product is then washed with water and extracted with ether. The aqueous portion of the solution is made basic with an alkali such as sodium hydroxide or potassium carbonate and again extracted with ether. The ether extract is then subjected to fractional distillation under reduced pressure and the desired product comprising the ethylated p-toluidine is separated and recovered.

*Example IV*

A glass liner of a rotating autoclave containing 53 grams of aniline hydrobromide is sealed into the autoclave and 1-butene is pressed in until an initial pressure of 50 atmospheres is reached. The autoclave and contents thereof are then heated to a temperature of about 200° C. and maintained within the range of from 200° to about 300° C. for a period of about 5 hours. At the end of this time the autoclave and contents thereof are allowed to cool to room temperature, the excess pressure is vented, the autoclave is opened and the reaction product recovered. The recovered product is treated in a manner similar to that set forth in the above examples and the desired butylated aniline is separated and recovered.

*Example V*

1-naphthylamine hydrochloride (56 grams) is placed in the glass liner of a rotating autoclave which is sealed and pressured to an initial pressure of 50 atmospheres with ethylene. The autoclave is heated and maintained at a temperature within the range of from about 200° to about 300° C. for a period of about 5 hours. At the end of this time the reaction product is recovered and subjected to treatment similar to that set forth in the above examples, the desired ethylated naphthylamine being separated and recovered by fractional distillation under reduced pressure.

I claim as my invention:

1. A process for the production of a nuclearly and N-alkylated aromatic amine which comprises alkylating a hydrohalide salt of an aromatic amine with an olefin of from 2 to 12 carbon atoms per molecule at a temperature in the range of from about 200° to about 400° C. and at a pressure within the range of from about atmospheric to about 150 atmospheres, and recovering the resultant nuclearly and N-alkylated aromatic amine.

2. The process of claim 1 further characterized in that said salt is selected from the group consisting of the hydrochlorides and hydrobromides of aniline, methyl and ethyl aniline, naphthylamine and methyl and ethyl naphthylamine, phenylenediamine and methyl and ethyl phenylenediamine, and triaminobenzene.

3. A process as defined in claim 1 further characterized in that said olefin is ethylene.

4. A process as defined in claim 1 further characterized in that said olefin is propylene.

5. A process as defined in claim 1 further characterized in that said olefin is 1-butene.

6. A process for the production of a nuclearly and N-alkylated aniline which comprises alkylating aniline hydrochloride with an olefin of from 2 to 12 carbon atoms per molecule at a temperature in the range of from about 200° to about 400° C. and at a pressure within the range of from about atmospheric to about 150 atmospheres, and recovering the resultant nuclearly and N-alkylated aniline.

7. A process for the production of a nuclearly and N-alkylated aniline which comprises alkylating aniline hydrobromide with an olefin of from 2 to 12 carbon atoms per molecule at a temperature in the range of from about 200° to about 400° C. and at a pressure within the range of from about atmospheric to about 150 atmospheres, and recovering the resultant nuclearly and N-alkylated aniline.

8. A process for the production of a nuclearly and N-alkylated p-toluidine which comprises alkylating p-toluidine hydrochloride with an olefin of from 2 to 12 carbon atoms per molecule at a temperature in the range of from about 200° to about 400° C. and at a pressure within the range of from about atmospheric to about 150 atmospheres, and recovering the resultant nuclearly and N-alkylated p-toluidine.

9. A process for the production of a nuclearly and N-alkylated p-toluidine which comprises alkylating p-toluidine hydrobromide with an olefin of from 2 to 12 carbon atoms per molecule at a temperature in the range of from about 200° to about 400° C. and at a pressure within the range of from about atmospheric to about 150 atmospheres, and recovering the resultant nuclearly and N-alkylated p-toluidine.

10. A process for the production of a nuclearly and N-alkylated 1-naphthylamine which comprises alkylating 1-naphthylamine hydrochloride with an olefin of from 2 to 12 carbon atoms per molecule at a temperature in the range of from about 200° to about 400° C. and at a pressure within the range of from about atmospheric to about 150 atmospheres, and recovering the resultant nuclearly and N-alkylated 1-naphthylamine.

11. A process for the production of a nuclearly and N-ethylated aniline which comprises alkylating aniline hydrochloride with ethylene at a temperature in the range of from about 200° to about 300° C. and at a pressure in the range of from about 30 to about 50 atmospheres, and recovering the resultant ethylated aniline.

12. A process for the production of a nuclearly and N-propylated aniline which comprises alkylating aniline hydrochloride with propylene at a temperature in the range from about 200° to about 300° C. and at a pressure in the range of from about 30 to about 50 atmospheres, and recovering the resultant propylated aniline.

13. A process for the production of a nuclearly and N-ethylated p-toluidine which comprises alkylating p-toluidine hydrochloride with ethylene at a temperature in the range of from about 200° to about 300° C. and at a pressure in the range of from about 30 to about 50 atmospheres, and recovering the resultant ethylated p-toluidine.

14. A process for the production of a nuclearly and N-butylated aniline which comprises alkylating aniline hydrobromide with 1-butene at a temperature in the range of from about 200° to about 300° C. and at a pressure in the range of from about 30 to about 50 atmospheres, and recovering the resultant butylated aniline.

15. A process for the production of a nuclearly and N-ethylated 1-naphthylamine which comprises alkylating 1-naphthylamine hydrochloride with ethylene at a temperature in the range of from about 200° to about 300° C. and at a pressure in the range of from about 30 to about 50 atmospheres, and recovering the resultant ethylated naphthylamine.

References Cited by the Examiner

UNITED STATES PATENTS

| | | | |
|---|---|---|---|
| 1,994,852 | 3/1935 | Carleton et al. | 260—577 |
| 2,051,123 | 8/1936 | Aickelin | 260—577 |
| 2,150,832 | 3/1939 | Hinman et al. | 260—577 |
| 2,285,243 | 6/1942 | Weinmayr | 260—576 XR |
| 2,692,287 | 10/1954 | Bell et al. | 260—576 XR |

OTHER REFERENCES

Groggins Unit Processes In Organic Synthesis, 1947, 3rd. ed. New York, pp. 564–580.

CHARLES B. PARKER, *Primary Examiner.*